United States Patent [19]
Masaie et al.

[11] Patent Number: 5,554,308
[45] Date of Patent: Sep. 10, 1996

[54] LUBRICANT FOR WIRE FEEDING AND WIRE DRAWING AND A WELDING WIRE MANUFACTURED BY USING THE SAME

[75] Inventors: Norio Masaie; Tomoyuki Tachibana; Koji Seita; Yasuo Araike, all of Fujisawa, Japan

[73] Assignee: Kabushiki Kaisha Kobe Seiko Sho, Kobe, Japan

[21] Appl. No.: 463,257

[22] Filed: Jun. 5, 1995

Related U.S. Application Data

[63] Continuation of Ser. No. 985,151, Dec. 3, 1992, abandoned.

[30] Foreign Application Priority Data

Dec. 3, 1991 [JP] Japan ..................... 3-348242

[51] Int. Cl.$^6$ .................. C10M 125/00; C10M 125/18; C10M 131/00
[52] U.S. Cl. .................................................. 508/181
[58] Field of Search ..................... 252/49.3, 49.5

[56] References Cited

U.S. PATENT DOCUMENTS

| | | | |
|---|---|---|---|
| 3,293,203 | 12/1966 | Paulus | 260/37 |
| 3,321,944 | 5/1967 | Ball | 72/46 |
| 3,772,249 | 11/1973 | Morgans | 524/434 |
| 4,640,955 | 2/1987 | Malhotra | 524/546 |

FOREIGN PATENT DOCUMENTS

| | | |
|---|---|---|
| 29866 | 3/1979 | Japan . |
| 55-54297 | 4/1980 | Japan . |
| 17638 | 4/1982 | Japan . |
| 2-298596 | 12/1990 | Japan . |
| 56910 | 1/1969 | Luxembourg . |
| 949752 | 2/1964 | United Kingdom . |
| 1406238 | 9/1975 | United Kingdom . |

OTHER PUBLICATIONS

Patent Abstracts of Japan, vol. 4, No. 96, (N–20)(578), Jul. 11, 1980, JP-55 054 297, Apr. 21, 1980.
Derwent Publications, Ltd., AN 016305, JP-A-59 213 796, Dec. 3, 1984.

*Primary Examiner*—Kathryn Gorgos
*Assistant Examiner*—Edna Wong
*Attorney, Agent, or Firm*—Oblon, Spivak, McClelland, Maier & Neustadt, P.C.

[57] ABSTRACT

A lubricant for wire feeding and wire drawing which comprises polytetrafluoroethylene powder, 0.5–40 μm (or 0.5–20 μm) in particle diameter, dispersed in water or an aqueous dispersion containing polytetrafluoroethylene powder, 0.1–0.4 μm in particle diameter.

A welding wire whose surface is coated with a lubricant mentioned above and a welding wire which has been drawn by the aid of a lubricant mentioned above.

6 Claims, 1 Drawing Sheet

LUBRICANT FOR WIRE FEEDING AND WIRE DRAWING AND A WELDING WIRE MANUFACTURED BY USING THE SAME

This application is a Continuation of application Ser. No. 07/985,151, filed on Dec. 3, 1992, now abandoned.

BACKGROUND OF THE INVENTION

1. Field of the Invention

The present invention relates to a lubricant. More particularly, the present invention relates to a Flon-free lubricant for wire feeding and wire drawing and also to a welding wire coated with said lubricant and produced by the used of said lubricant.

2. Description of the Prior Art

Welding wires (including solid wires and cored wires) are manufactured by the wire-drawing process which employs dies and rollers. Therefore, they have minute irregularities on their surface in the longitudinal and circumferential directions. These minute irregularities have an adverse effect on the feeding of the welding wire to the welding torch through the conduit tube and also on the electrical conductivity between the welding wire and the tip. The adverse effect of minute irregularities on the wire surface is reduced conventionally by coating the wire surface with a powder of polytetrafluoroethylene (abbreviated as PTFE hereinafter). (See Japanese Patent Publication No. 17638/1982.)

According to the conventional practice, the coating of the wire surface with PTFE powder is accomplished by dipping the wire in a solvent dispersion of PTFE powder, followed by drying for solvent removal. The dispersing medium for PTFE powder is Flon-113, which is a fluorocarbon solvent. This solvent is most desirable because it contains no hydrogen and dries fast.

It has recently been considered that Flon-113 destroys the ozone layer. This has moved UNEP (United Nations Environment Programme) to regulate the use of Flon-113. The Montreal Protocol declares the ban of Flon-113 after the year 2000. Under these circumstance, it is an urgent necessity to develop a substitute for PTFE dispersion in Flon.

PTFE dispersion in Flon is used mainly as a lubricant for wire feeding. It is also used as a lubricant for wire drawing. Its use as a lubricant poses the problem associated with the destruction of the ozone layer.

SUMMARY OF THE INVENTION

The present invention was completed to address this problem. It is an object of the present invention to provide a Flon-free lubricant for wire feeding and wire drawing.

The first aspect of the present invention resides in a lubricant for wire feeding and wire drawing which comprises polytetrafluoroethylene powder, 0.5–40 µm in particle diameter, dispersed in water.

The second aspect of the present invention resides in a lubricant for wire feeding and wire drawing which comprises polytetrafluoroethylene powder, 0.5–40 µm in particle diameter, dispersed in an aqueous dispersion containing polytetrafluoroethylene powder, 0.1–0.4 µm in particle diameter.

The third aspect of the present invention resides in a welding wire coated with or manufactured by the use of said lubricant.

DESCRIPTION OF THE PREFERRED EMBODIMENTS

Figure 1:
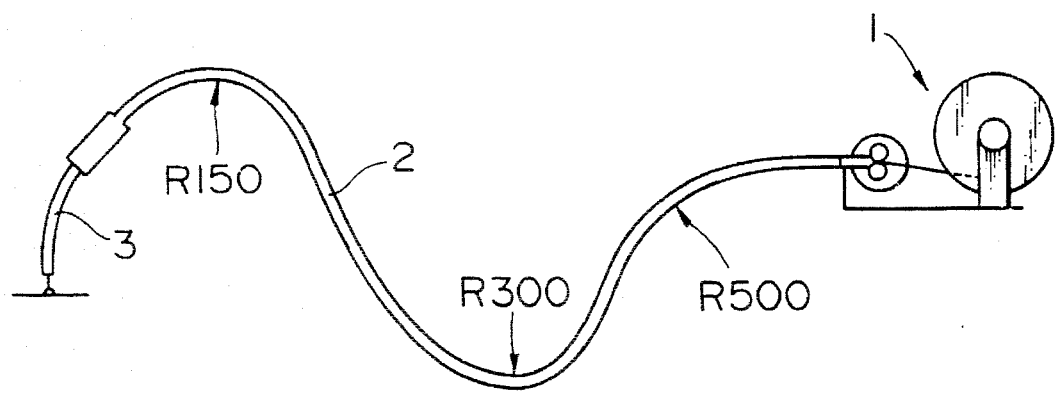
FIG. 1 is a schematic drawing showing the arrangement of the conduit used to measure the resistance to wire feeding.

The invention will be described in more detail with reference to the results of the basic experiments which led to the present invention.

(1) Studies on PTFE dispersion in a non-Flon organic solvent

PTFE is representative of hydrophobic substances. At the beginning, a dispersion of PTFE powder was prepared by the use of organic dispersing media such as n-hexane, isopropyl alcohol, and mineral oil. Dispersion was accomplished by mixing a commercial PTFE powder with a binder and organic solvent in a ball mill or homogenizer. It was found that PTFE powder is easily dispersed in an organic solvent. The PTFE dispersion in an organic solvent was found to be as good as the conventional PTFE dispersion in Flon when used as a lubricant for wire feeding and wire drawing. However, it is not yet in practical use because of many problems involved. For example, the use of a flammable organic solvent poses problems associated with safety and hygiene. Nevertheless, these studies revealed something very important about the properties of PTFE.

The conventional PTFE dispersion in Flon contains PTFE powder which is a low-molecular weight product called telomer (having an average molecular weight of about 3500 compared with that of tens to hundreds of thousand for ordinary polymers). PTFE powder as such is not commercially available but is available only in the form of dispersion, because particles in the dispersion irreversibly agglomerate upon drying of the dispersion.

In view of this, the present inventors studied the possibility of replacing the powder of PTFE telomer by the mechanically crushed fine powder of ordinary high-molecular weight PTFE (simply referred to as PTFE hereinafter). It is said that the powder of PTFE telomer is smaller than 0.4 µm in particle diameter. As the substitute for the powder of PTFE telomer, there were prepared two kinds of fine powder of high-molecular weight PTFE, one having a particle diameter smaller than 0.4 µm and another, larger than 0.4 µm.

These powder samples were tested for lubricity in wire feeding. It was unexpectedly found that the powder sample coarser than 0.4 µm is superior to that finer than 0.4 µm. For further investigation, several powder samples with a particle diameter greater than 0.4 µm were tested. It was found that powder samples with a particle diameter greater than 40–50 µm tend to be poor in lubricity for wire feeding. If the welding wire is used in the welding apparatus such as FIG. 1, the resistance to wire feeding is strong since the curvature of the conduit is large (>R150). It was concluded that the finely crushed PTFE powder should preferably have a particle diameter in the range of 0.5 to 10 µm, depending on the hardness and roughness of the wire surface and the amount of PTFE powder applied.

(2) Studies on PTFE dispersion in water

In order to overcome the disadvantage of using an organic solvent, the present inventors studied the usefulness of water as a dispersing medium for PTFE powder. Since it is impossible to directly disperse PTFE powder into water, attempts were made to perform surface treatment in different ways (such as oxidation and alcoholization) or to use several kinds of surface active agents. It was found that the surface treatment in combination with the application of surface active agent facilitates the dispersion of PTFE powder into water. However, it was also found that the resulting dispersion is poor in stability and the PTFE powder settles within a short time. The dispersion had to be stirred just before use. Stirring permitted the settled PTFE powder to be easily dispersed again.

To eliminate the necessity of mechanical stirring, the present inventors studied an aqueous dispersion of PTFE prepared by emulsion polymerization, which is commercially available for use as a coating material. The results of the studies revealed that it needs improvement if it is to be used as a lubricant for wire feeding and wire drawing. This problem was solved by utilizing the findings obtained in the basic studies on the PTFE dispersion in organic solvent. In other words, it was possible to improve the lubricity of the aqueous dispersion of PTFE (which has a particle diameter as small as 0.1–0.4 µm) by mixing with coatset PTFE powder. The PTFE powder to be added to water and the aqueous dispersion of PTFE should have a particle diameter greater than 0.5 µm. With a particle diameter smaller than 0.5 µm, the PTFE powder does not contribute to lubricity. With a particle diameter larger than 40 µm, the PTFE powder has an adverse effect on lubricity. The preferred particle diameter ranges from 0.5 to 40 µm, or from 0.5 to 20 µm for better wire drawing performance.

There is no specific restriction on the amount of the PTFE powder to be added to water and the aqueous dispersion of PTFE; however, it should preferably be more than 5 g per liter of the lubricant.

For the improved adhesion of the PTFE powder, it is advisable to incorporate a binder (of resin emulsion type) into the dispersion. A preferred binder is a fluorocarbon resin copolymerized with functional groups such as hydroxyl group, carboxyl group, epoxy group, amino group, amido group, nitrile group, and silanol group. The binder also includes acrylic polymer and vinyl acetate polymer. Thermosetting resins typified by phenolic resin may be used under certain conditions. The amount of the binder should be 0.1–30 vol % of the lubricant.

The lubricant of the present invention is slightly inferior in coating properties to the conventional PTFE lubricant of Flon dispersion type when it is applied to wire by dipping. Where uniform coating onto the wire surface is required, it should preferably be applied by electrostatic spraying. In addition, it should preferably be incorporated with surface active agent (in an amount of 0.1–10 vol %) for uniform coating.

EXAMPLES

The invention will be described with reference to the following examples.

Example 1

This example is concerned with lubricants for wire feeding.

Lubricant samples were prepared by mixing a PTFE powder of desired particle diameter, a surface active agent, and a binder in water using a homogenizer. Each of the lubricant samples was applied to a flux-cored wire for stainless steel by electrostatic spraying. The coated wire was tested for feedability using the apparatus as shown in FIG. 1. (The amount of the lubricant applied was controlled such that the lubricant leaves on the wire surface the same amount of PTFE as the conventional lubricant (PTFE dispersion in Flon) does when the latter is applied in an amount sufficient for desired wire feeding performance and welding performance.)

Table 1 shows the compositions of the lubricant samples and the results of the test. Table 2 shows the criteria for evaluating the resistance to wire feeding and the fluctuation in the resistance to wire feeding.

TABLE 1

| Test No. | Lubricant sample | | Resistance to wire feeding | Fluctuation of resistance to wire feeding | Rating | Remarks |
| --- | --- | --- | --- | --- | --- | --- |
| | Particle size of PTFE (µm) | Amount of PTFE added (g/L) | | | | |
| 1 | PTFE dispersion in Flon | | good | good | good | Conventional example |
| 2 | 0.4> | 20 | poor | poor | poor | Comparative example |
| 3 | 0.6–1.0 | 20 | good | good | good | Working example |
| 4 | 1.0–5.0 | 3 | good | fair | good | Working example |
| 5 | 1.0–5.0 | 5 | good | good | good | Working example |
| 6 | 1.0–5.0 | 10 | good | good | good | Working example |
| 7 | 5.0–10 | 40 | good | good | good | Working example |
| 8 | 10–40 | 20 | good | good | good | Working example |
| 9 | 10–40 | 80 | good | fair | good | Working example |
| 10 | 40< | 10 | fair | fair | poor | Comparative example |

Note: Wire conforming to JIS Z3323, YF308C (1.2 mm in diameter)

TABLE 2

| Rating | Resistance to wire feeding (kg) | Fluctuation of resistance to wire feeding (kg) |
| --- | --- | --- |
| Good | <2 | <0.5 |
| Fair | 2–5 | 0.5–1 |
| Poor | >5 | >1 |

The following are noted from Table 1. Test No. 1 proved that the conventional lubricant of PTFE dispersed in Flon permits smooth wire feeding. Test No. 2 for comparative example proved that the lubricant of aqueous dispersion of PTFE with a particle diameter smaller than 0.4 µm does not permit smooth wire feeding. Also, Test No. 10 for comparative example proved that the lubricant of aqueous dispersion of PTFE with a particle diameter larger than 40 µm does not permit smooth wire feeding. By contrast, Test Nos. 3 to 9 for working examples proved that the aqueous dispersion of PTFE with an adequate particle diameter permits smooth wire feeding, with a minimum of fluctuation in resistance to wire feeding. Test Nos. 3, 5, 6, 7, and 8 gave especially good results. Test No. 4 showed that fluctuation in resistance to wire feeding slightly increases because the amount of PTFE in the lubricant is small. Test No. 9 also showed that fluctuation in resistance to wire feeding slightly increases because the amount of PTFE in the lubricant is so large that the lubricant is too viscous to be applied uniformly to the wire surface.

Example 2

This example is concerned with lubricants for wire drawing.

Lubricant samples were prepared by dispersing a PTFE powder of desired particle diameter into water using a ball mill. Each of the lubricant samples was applied to a solid wire for stainless steel by dipping, followed by hot-air drying. The solid wire was tested for drawability in the production line. The performance of the lubricant was evaluated in terms of the maximum drawing speed attained in the production line. (The amount of the lubricant applied was controlled such that the lubricant leaves on the wire surface the same amount of PTFE as the conventional lubricant (PTFE dispersion in Flon) does when the latter is applied in an amount sufficient for desired wire drawing performance.) Table 3 shows the compositions of the lubricant samples and the results of the drawing test.

stick well to the wire surface.) By contrast, Test Nos. 3 to 8 for working examples proved that the aqueous dispersion of PTFE with an adequate particle diameter permits smooth wire drawing. Test Nos. 3, 6, and 7 gave especially good results. Test No. 6 gave better results than Test No. 1 for the conventional lubricant. Test No. 4 gave slightly poorer results than Test No. 1 for the conventional lubricant because the amount of PTFE dispersed in water is small. Test No. 8 showed that the lubricant sample containing a large amount of PTFE causes the die life to fluctuate slightly more than the conventional lubricant (although the reason for this is not known).

The same procedure as in Examples 1 and 2 was repeated except that the water was replaced by an aqueous dispersion of polytetrafluoroethylene powder, 0.1–0.4 μm in particle diameter. There were obtained the same results as shown in Tables 1 and 3.

What is claimed is:

1. A lubricant for wire feeding and wire drawing consisting essentially of an aqueous dispersion, wherein water is the dispersing medium, of larger polytetrafluoroethylene powder of 0.5–40 μm in particle diameter and polytetrafluoroethylene powder of 0.1–0.4 μm in particle diameter, and wherein the amount of larger polytetrafluoroethylene powder is present in an amount of 5 g to 40 g per liter of the lubricant.

2. A lubricant for wire drawing as defined in claim 1, wherein the larger polytetrafluoroethylene powder is 0.5–20 μm in particle diameter.

TABLE 3

| Test No. | Lubricant sample | | Wire drawing performance | Rating | Remarks |
| --- | --- | --- | --- | --- | --- |
| | Particle size of PTFE (μm) | Amount of PTFE added (g/L) | | | |
| 1 | PTFE dispersion in Flon | | good | good | Conventional example |
| 2 | 0.4> | 10 | poor | poor | Comparative example |
| 3 | 0.6–1.0 | 20 | good | good | Working example |
| 4 | 0.6–5.0 | 3 | fair | good | Working example |
| 5 | 0.6–5.0 | 5 | good | good | Working example |
| 6 | 0.6–5.0 | 20 | excellent | excellent | Working example |
| 7 | 5.0–40 | 20 | good | good | Working example |
| 8 | 5.0–40 | 80 | good | good | Working example |
| 9 | 40< | 20 | poor | poor | Comparative example |

Note 1: Wire conforming to JIS Z3321, Y308C (1.2 mm in diameter)
Note 2: Criteria for rating the wire drawing performance.
excellent: greater than 120% compared with the present drawing speed
good: 100–120% compared with the present drawing speed
fair: 80–100% compared with the present drawing speed
poor: smaller than 80% compared with the present drawing speed The following are noted from Table 3. Test No. 1 proved that the conventional lubricant of PTFE dispersed in Flon permits smooth wire drawing. Test No. 2 for comparative example proved that the lubricant of aqueous dispersion of PTFE with a particle diameter smaller than 0.4 μm does not permit smooth wire drawing although it permits wire drawing at low speeds. (Without PTFE, wire drawing was impossible.) Also, Test No. 9 for comparative example proved that the lubricant of aqueous dispersion of PTFE with a particle diameter larger than 40 μm does not permit smooth wire drawing. (It seems that coarse PTFE powder particles do not 3. A lubricant for wire feeding as defined in claim 1, wherein the larger polytetrafluoroethylene powder is 0.5–10 μm in particle diameter.

4. A lubricant for wire feeding as defined in claim 1 further comprising a binder and a surface-active agent.

5. A lubricant for wire feeding as defined in claim 2 further comprising a binder and a surface-active agent.

6. A lubricant for wire feeding as defined in claim 3 further comprising a binder and a surface-active agent.

* * * * *